US012758364B2

(12) United States Patent
Radmand et al.

(10) Patent No.: US 12,758,364 B2
(45) Date of Patent: Oct. 13, 2026

(54) ORTHODONTIC EXPANSION DEVICE

(71) Applicant: Achaemenid, LLC, Stratford, CT (US)

(72) Inventors: Reza Radmand, Boston, MA (US); Stephen J Cole, White Plains, NY (US)

(73) Assignee: ACHAEMENID, LLC, Stratford, CT (US)

( * ) Notice: Subject to any disclaimer, the term of this patent is extended or adjusted under 35 U.S.C. 154(b) by 861 days.

(21) Appl. No.: 17/613,526

(22) PCT Filed: Jun. 4, 2020

(86) PCT No.: PCT/US2020/036033
§ 371 (c)(1),
(2) Date: Nov. 23, 2021

(87) PCT Pub. No.: WO2020/247570
PCT Pub. Date: Dec. 10, 2020

(65) Prior Publication Data

US 2022/0257348 A1 Aug. 18, 2022

Related U.S. Application Data

(60) Provisional application No. 62/857,294, filed on Jun. 5, 2019.

(51) Int. Cl.
*A61C 7/10* (2006.01)

(52) U.S. Cl.
CPC .................................... *A61C 7/10* (2013.01)

(58) Field of Classification Search
CPC .... A61C 7/00; A61C 7/12; A61C 7/18; A61C 7/22; A61C 7/08; A61C 7/10; A61C 7/20; A61C 7/28; A61C 7/34

(Continued)

(56) References Cited

U.S. PATENT DOCUMENTS

| | | | | |
|---|---|---|---|---|
| 597,582 A * | 1/1898 | Knapp | ..................... | A61C 7/10 433/7 |
| 3,832,778 A * | 9/1974 | Wallshein | ................ | A61C 7/10 433/7 |

(Continued)

FOREIGN PATENT DOCUMENTS

| | | |
|---|---|---|
| DE | 211137 C | 6/1909 |
| DE | 2815102 A1 | 10/1978 |

(Continued)

OTHER PUBLICATIONS

CA Office Action dated Aug. 30, 2023 re related CA Application No. 3,140,304 filed Dec. 1, 2021 5 pages.

(Continued)

*Primary Examiner* — Heidi M Eide
*Assistant Examiner* — Jennifer P Connell
(74) *Attorney, Agent, or Firm* — Tarolli, Sundheim, Covell & Tummino LLP

(57) ABSTRACT

An orthodontic expansion device includes a pair of opposed lateral portions, each of which includes a molar band shaped to be positioned on molars or other teeth of a patient. A palate frame extends obliquely from the molar band. The device further includes a tensioned tensioning assembly positioned between the pair of opposed lateral portions that applies an outward pressure on the palate of the patient. The tensioning assembly is at least partially detachable for adjusting the tension of the device. As the palate expands, and the tension in the device relaxes, the tensioning assembly can readily be detached, retensioned, and reattached.

18 Claims, 7 Drawing Sheets

(58) Field of Classification Search
USPC .............................................................. 433/7
See application file for complete search history.

(56) References Cited

U.S. PATENT DOCUMENTS

| | | | | |
|---|---|---|---|---|
| 4,040,187 | A | 8/1977 | Cardena | |
| 4,144,643 | A | 3/1979 | Krygier | |
| 4,324,036 | A | 4/1982 | Reilly | |
| 4,571,178 | A * | 2/1986 | Rosenberg | A61C 7/10 433/7 |
| 5,564,920 | A | 10/1996 | Klapper et al. | |
| 5,829,975 | A * | 11/1998 | Gold | A61C 7/36 433/19 |
| 6,220,856 | B1 | 4/2001 | Carano et al. | |
| 6,302,687 | B1 | 10/2001 | King | |
| 6,358,255 | B1 * | 3/2002 | Testa | A61C 7/10 433/7 |
| 6,402,510 | B1 * | 6/2002 | Williams | A61C 7/36 433/18 |
| 6,520,772 | B2 | 2/2003 | Williams | |
| 6,568,935 | B2 | 5/2003 | Clark | |
| 6,592,366 | B2 | 7/2003 | Triaca et al. | |
| 7,074,036 | B1 | 7/2006 | Keles | |
| 7,156,654 | B2 | 1/2007 | Inman | |
| 7,981,118 | B2 | 7/2011 | Mommaerts | |
| 10,258,379 | B2 * | 4/2019 | Wang | A61B 17/663 |
| 10,271,925 | B2 | 4/2019 | Ji | |
| 11,219,508 | B2 * | 1/2022 | Atlan | A61C 7/10 |
| 2003/0091952 | A1 * | 5/2003 | Bowman | A61C 7/10 433/7 |
| 2003/0194675 | A1 | 10/2003 | Williams | |
| 2004/0152033 | A1 | 8/2004 | Collins | |
| 2008/0003535 | A1 | 1/2008 | Williams | |
| 2008/0072915 | A1 * | 3/2008 | Nelissen | A61F 5/566 128/848 |
| 2011/0027743 | A1 * | 2/2011 | Cinader, Jr. | A61C 7/06 433/10 |
| 2013/0252195 | A1 | 9/2013 | Popat | |
| 2016/0008098 | A1 * | 1/2016 | Dolfi | A61C 7/10 433/7 |
| 2019/0125495 | A1 | 5/2019 | Keles et al. | |

FOREIGN PATENT DOCUMENTS

| | | | |
|---|---|---|---|
| FR | 998076 | A | 1/1952 |
| WO | 1998/010708 | A1 | 3/1998 |

OTHER PUBLICATIONS

Dr. Bruce Oliver, Palatal expander, 2017, 2 pgs., http://oliverorthodontiste.ca/en/faq/palatal-expander.

International Searching Authority; International Search Report and Written Opinion for PCT App. No. PCT/US20/36033; Sep. 18, 2020; 8 pages.

Perennial Smiles Orthodontic Specialists, Type of Applicances, 2019, 14 pgs., https://www.perennialsmiles.com/.

European Patent Office; Supplementary European Search Report issued for EP 20818545.4 dated Aug. 10, 2023; 9 pages.

Canadian Intellectual Property Office; Office Action issued for Canadian Patent Application No. 3,140,304; Nov. 13, 2024; 5 pages.

European Patent Office; Intention to Grant of EP 20818545.4 dated Dec. 18, 2024; 28 pages.

* cited by examiner

ORTHODONTIC EXPANSION DEVICE

CROSS-REFERENCE TO RELATED APPLICATIONS

This patent application is a national stage application of and claims priority to Patent Cooperation Treaty (PCT) Application No. PCT/US2020/36033 filed Jun. 4, 2020, which claims the benefit of U.S. Provisional Application No. 62/857,294 filed Jun. 5, 2019, which is incorporated herein by reference in its entirety.

FIELD OF THE DISCLOSURE

An orthodontic device, for example, a palatal expansion device, is generally described.

BACKGROUND OF THE DISCLOSURE

Orthodontic devices for expanding a human patient's mandibular and maxillary palates or arches are known. These orthodontic devices, some of which are typically referred to as Herbst devices, aim to expand or enlarge the mandibular and/or maxillary arches and may be particularly useful for creating spaces in a person's mouth to accommodate, for example, the movement of teeth into desired positions. However, these devices are often difficult to adjust because they require the use of precision adjustment tools while having limited ability to access the adjustment feature of the device.

In view of the disadvantages associated with currently available orthodontic expansion devices, there is a need for an orthodontic expansion device that can be adjusted easily, and without the use of precision adjustment tools.

BRIEF DESCRIPTION OF THE EXEMPLARY EMBODIMENTS

According to an aspect, the exemplary embodiments include an orthodontic expansion device including a pair of opposed lateral portions or wings, each of which includes a molar band and a palate frame. The molar band is shaped to be placed on the molars of a patient, and the palate frame extends obliquely from the molar band, so that the palate frame lies against the patient's palate. The device further includes an adjustable tensioning assembly positioned between the pair of opposed lateral portions or wings that applies an outward pressure on the molars and palate of the patient. The tensioning assembly is at least partially detachable for adjusting the tension of the device, and therefore, the amount of pressure exerted on the molars and palate. As the palate expands, and the tension in the device relaxes, the tensioning assembly can easily be detached, retensioned, and reattached.

In another aspect, the exemplary embodiments include an orthodontic expansion device including a pair of opposed lateral portions or wings. The pair of opposed lateral wings each include a molar band shaped to receive molars of a patient, and a palate frame shaped to lie against the patient's palate. The palate frame extends obliquely from the molar band. A tensioning assembly is disposed between the first and second lateral wings and includes a cylinder, a spring positioned within the cylinder, a piston positioned in the cylinder adjacent the spring, and an adjustment rod. The cylinder includes a first, closed end pivotably attached to the first lateral wing and a second, open end opposite the closed end and detachably attached to the second lateral wing. According to an aspect, the adjustment rod retains the piston against the spring to maintain the first lateral wing and the second lateral wing in an outwardly tensioned relationship away from each other. The tensioning assembly can easily be detached, retensioned, and reattached to accommodate the expansion of the palate.

BRIEF DESCRIPTION OF THE DRAWINGS

A more particular description will be rendered by reference to exemplary embodiments thereof that are illustrated in the appended drawings. Understanding that these drawings depict exemplary embodiments thereof and do not limit the scope, the exemplary embodiments will be described and explained with additional specificity and detail through the use of the accompanying drawings in which.

Figure 1A:
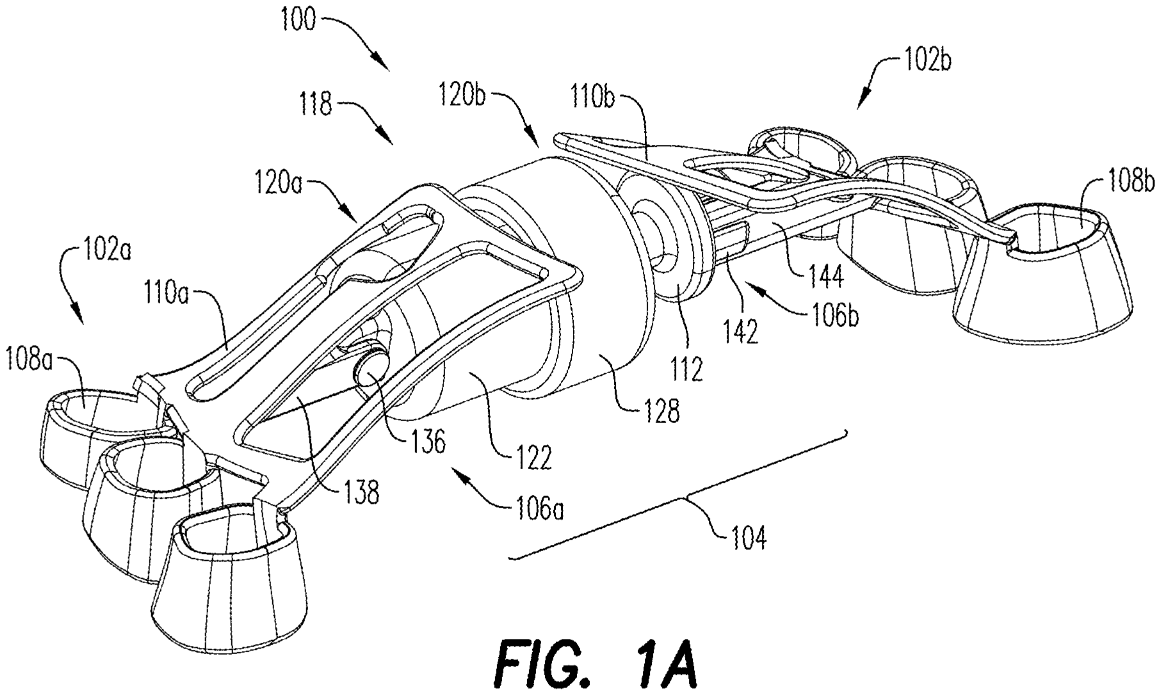
FIG. 1A is a schematic, perspective view of an orthodontic expansion device according to an embodiment.

Various features, aspects, and advantages of the exemplary embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various embodiments. Each example is provided by way of explanation and is not meant as a limitation and does not constitute a definition of all possible embodiments.

FIG. 1A schematically depicts an exemplary orthodontic expansion device 100, for example, a palate expander, according to the present disclosure. The orthodontic expansion device 100 includes a first lateral wing (or section or portion) 102*a*, a second lateral wing (or section or portion) 102*b* opposite the first lateral wing 102*a*, and a tensioning assembly 104 positioned between and connecting the first and second lateral wings 102*a*, 102*b* to one another. As will be discussed further below, the tensioning assembly 104 includes a first end 106*a* that may be pivotably attached to the first lateral wing 102*a* and a second end 106*b* that is detachably attached to the second lateral wing 102*b* for temporarily detaching and adjusting the tension within the tensioning assembly 104, and therefore, the pressure exerted by the orthodontic expansion device 100 on the molars and palate of the patient.

Still viewing FIG. 1A, the lateral wings 102*a*, 102*b* each include one or more respective molar bands 108*a*, 108*b* shaped to be placed or worn on (e.g., extend around and be secured in place by) a plurality of molar teeth (not shown), and a respective open, wire-like frame/palate frame 110*a*, 110*b* extending obliquely from the respective molar band 108*a*, 108*b*. While the word "molar" is used herein, it would be understood by one of ordinary skill in the art that the bands could attach to other teeth as well, including premolars. Further, while three (3) bands are depicted, it is also possible to provide the orthodontic expansion device 100 with less than or more than three bands. It is also possible that not every band will be filled by a tooth, as may be the case when, for instance, one or more teeth are missing. Each palate frame 110*a*, 110*b* is shaped (e.g., curved/contoured) to generally lie closely adjacent to, and preferably conform closely to the contours of, the shape of the patient's palate. It will be appreciated that, in this example, the palate frames 110*a*, 110*b* are shown as extending obliquely upwardly and inwardly towards one another for treatment of the upper palate. However, it is also contemplated that the orthodontic expansion device 100 can be inverted, and the frames 110*a*, 110*b* can extend obliquely downwardly and inwardly for treatment of the lower palate. In this example, each molar band 108*a*, 108*b* is shaped to extend around three teeth.

Figure 1B:
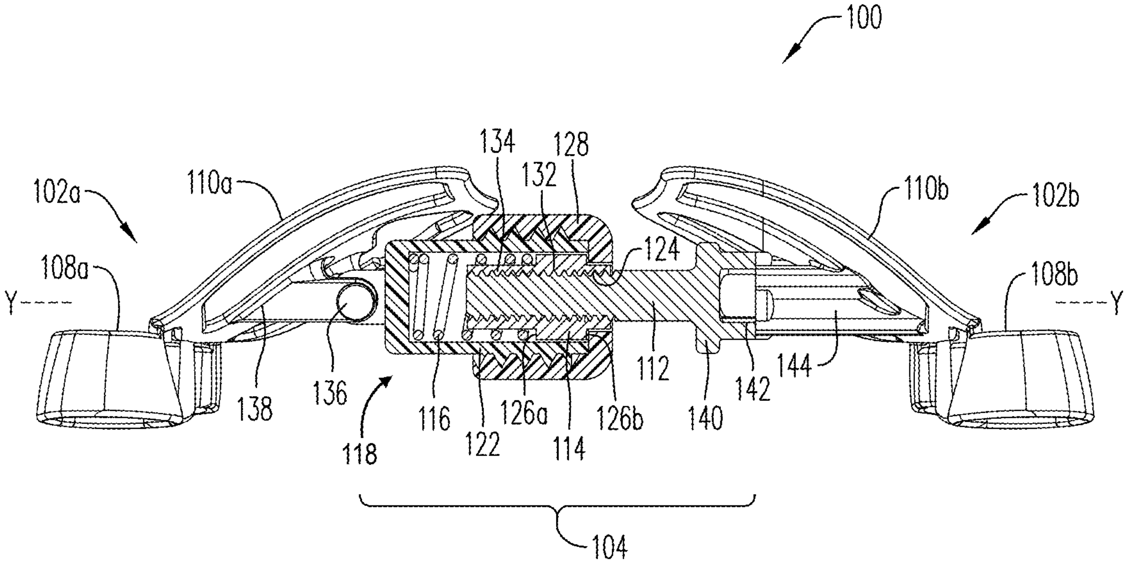
FIG. 1B is a schematic, partial cross-sectional side view of the orthodontic expansion device of FIG. 1A.

As shown in FIG. 1B, the tensioning assembly 104 of the orthodontic expansion device 100 generally includes an adjustment rod 112, a piston 114, and a spring 116 in cooperative engagement with one another. The piston 114, spring 116, and a portion of the adjustment rod 112 are enclosed within a housing 118. The housing 118 has a first, closed end 120*a* (FIG. 1A) proximate the first lateral wing 102*a* and a second, open end 120*b* (FIG. 1A) opposite the first end. The adjustment rod 112, piston 114, and spring 116 each generally lie along a common central longitudinal axis Y within the housing 118, such that their individual longitudinal centerlines are coaxial and colinear with one another. As will be explained further below, the adjustment rod 112, piston 114, and the spring 116 engage one another to maintain the first lateral wing 102*a* and the second lateral wing 102*b* in an outwardly tensioned relationship away from each other. The outward tension places pressure on the molars and palate to cause the palate to expand. After the palate expands, and the tension in the spring releases, the tensioning assembly 104 can be adjusted to re-tension/further expand the orthodontic expansion device 100.

Still viewing FIG. 1B, the spring 116 is seated within a cylinder 122 having a first, closed end (e.g., along the closed end 120*a* of the housing 118) proximate and attached to the first lateral wing 102*a*, and a second, open end opposite the closed end (e.g., along the open end 120*b* of the housing 118). The spring 116 includes a first end disposed along the first, closed end of the cylinder 122, and a second end opposite the first end of the spring 116. The piston 114 is also seated in the cylinder 122. The piston 114 is generally cylindrical in shape with a central/interior bore 124 extending along its length. The piston 114 includes a first shoulder 126*a* for engaging the second end of the spring 116, as will be described below. An interiorly threaded cylinder cap 128 engages threads along an exterior surface of the second, open end of the cylinder 122 to retain the spring 116 and a second shoulder 126*b* of the piston 114 within the cylinder 122. The cylinder 122 and cylinder cap 128 collectively form the housing 118.

The closed end 120*a* of housing 118 (and more particularly cylinder 122), which at least partially forms and/or defines the first end 106*a* of the tensioning assembly 104, is pivotably joined to the first lateral wing 102*a*, as will be described in greater detail below.

Figure 1C:
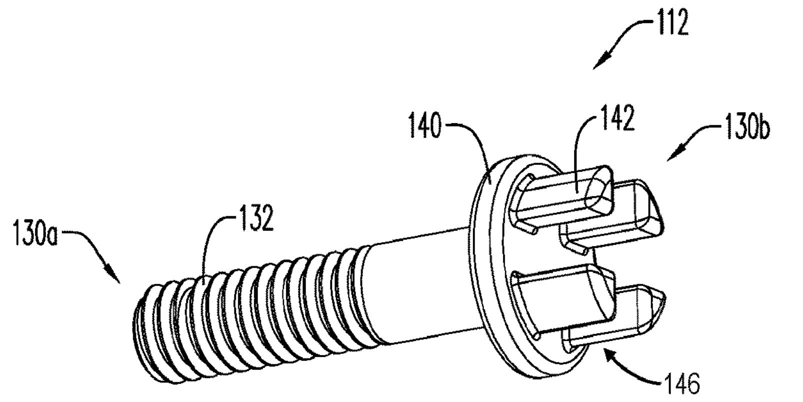
FIG. 1C is a schematic, perspective view of an adjustment rod of the orthodontic expansion device of FIG. 1A, in isolation.

Still viewing FIG. 1B, and also viewing FIG. 1A and FIG. 1C (which schematically illustrates the adjustment rod 112 in isolation), the adjustment rod 112 has a first end 130*a* and a second end 130*b* opposite one another. The first end 130*a* of the adjustment rod 112 includes threads 132 that engage corresponding threads 134 positioned along the central/interior bore 124 of the piston 114, such that the first end 130*a* of the adjustment rod 112 extends into the bore 124 of the piston 114, as shown in FIG. 1B. The portion of the adjustment rod 112 that extends into the bore 124 (e.g., the first end 130*a* of the adjustment rod 112*a*) lies within the tensioning assembly housing 118. The second end 130*b* of the adjustment rod, which at least partially forms and/or defines the second end 106*b* of the tensioning assembly 104, is detachably connected to the second lateral wing 102*b*, as will be explained below.

As the adjustment rod 112 is threaded into the bore 124 of the piston 114, the piston 114 may move towards the closed end 120*a* of the housing 118. In doing so, the shoulder 126*a* of the piston 114 engages the spring 116 (e.g., the second end of the spring), compressing it towards the closed end 120*a* of the housing 118. When adjustment of the rod 112 is complete, and the orthodontic expansion device 100 is in use (as will be described below), the at least partially compressed spring 116 exerts a pressure on the piston 114, which in turn exerts a pressure on the adjustment rod 112 threaded into the bore 124 of the piston 114, which in turn maintains the first and second lateral wings 102*a*, 102*b* of the orthodontic expansion device 100 in an opposed, outwardly urged tension away from one another. Described in another way, the wings 102*a*, 102*b* are pushed apart by a degree dictated by the tension of the spring 116 and the position of the rod 112 within the piston 114. As a result, a pressure is exerted outwardly and upwardly (or downwardly) on the respective molar bands 108*a*, 108*b* and frames 110*a*, 110*b* to expand the palate of the patient/wearer. The amount of pressure applied on the palate and teeth may vary depending on the selection of the spring 116 used in the tensioning assembly 104. The amount of pressure applied to the palate and teeth may be up to about 5000 grams (g). The pressure range may generally range from about 450 g to about 5000 g. This may be achieved using springs of different spring rates to cover smaller incremental ranges. As the palate expands, the piston 114 moves back towards the open end 120*b* of the housing 118 and the tension in the spring 116 decreases, the orthodontic expansion device 100 can be adjusted to increase the tension again if needed, as will be described below.

As stated previously, the first end 106*a* of the tensioning assembly 104 is pivotably attached to the first lateral wing 102*a* and the second end 106*b* of the tensioning assembly 104 is removably attached to the second lateral wing 102*b*. This allows the tensioning assembly 104 to be partially detached and adjusted as needed to maintain the desired level of tension for palate expansion.

Figure 1D:
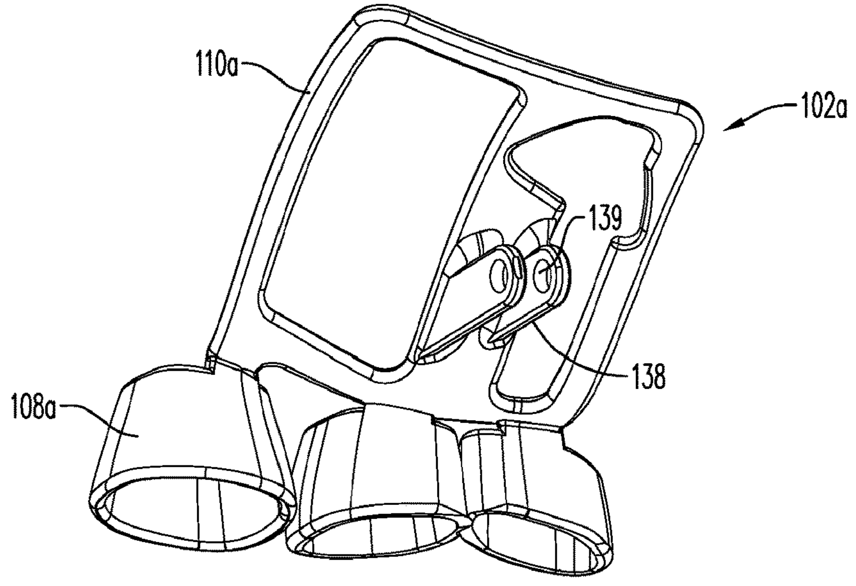
FIG. 1D is a schematic, perspective view of a first lateral wing of the orthodontic expansion device of FIG. 1A, in isolation.

Specifically, viewing FIGS. 1A and 1B, the first end 106*a* of the tensioning assembly 104 (more particularly, housing 118, and even more particularly, cylinder 122) is pivotably connected by a hinge pin 136 to a hinge arm 138 extending from the frame 110*a* of the first lateral wing 102*a*. The hinge arm 138, seen for instance in FIG. 1D, may include an opening 139 to receive the hinge pin 136. The pivotable connection allows the tensioning assembly 104 to pivot or move away from the first lateral wing 102*a* to adjust the tension of the piston 114 against the spring 116.

Figure 1E:
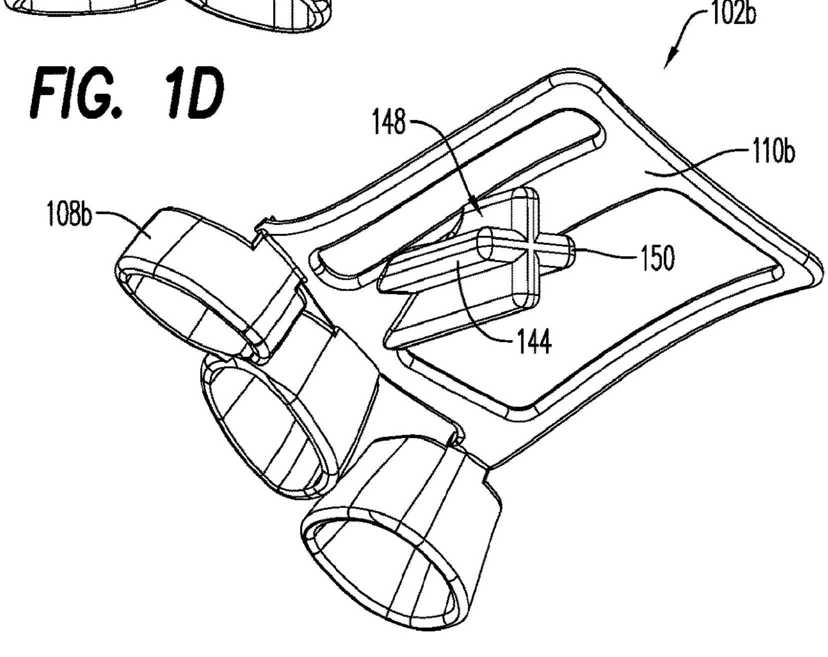
FIG. 1E is a schematic, perspective view of a second lateral wing of the orthodontic expansion device of FIG. 1A, in isolation.

Returning to FIG. 1C, the second end 130*b* of the adjustment rod 112 includes a flattened area or flange 140 including a plurality of outwardly extending projections (e.g., teeth/clutch teeth) 142. As shown in FIGS. 1B and 1E (which shows the second lateral wing 102*b* in isolation), the teeth 142 are configured for engaging a connector 144 that projects inwardly from the second lateral wing 102*b* towards the first lateral wing 102*a*. As shown herein, the connector 144 is configured with four bars 150 (having a cross-sectional cross-shaped configuration). Thus, the cross-shaped connector 144 is shaped and dimensioned to fit in the space(s) 146 between the teeth 142 along the second end 130*b* of the adjustment rod 112, with both the teeth 142 and connector 144 in any properly aligned rotational orientation (such that there are four possible proper rotational engagements at every 90 degree rotation). Likewise, the teeth 142 of the adjustment rod 112 are shaped and dimensioned to fit in the spaces 148 around/adjacent to the bars 150 of the cross-shaped connector 144, with both the teeth 142 and connector 144 in any properly aligned rotational orientation (such that there are four possible proper rotational engagements at every 90 degree rotation). In this example, the adjustment rod 112 includes four teeth, each of which has a somewhat triangular shape when viewed as a projection. However, other possibilities are contemplated.

The second end 106*b* (FIG. 1A) of the tensioning assembly 104 may be repeatedly detached and re-attached and the adjustment rod 112 may be repeatedly adjusted as needed to maintain the desired level of tension between the first and second lateral wings 102*a*, 102*b*.

Adjustment of the orthodontic expansion device 100 may be illustrated generally in connection with FIGS. 2A-2F, which are only partially labeled.

Figure 2A:
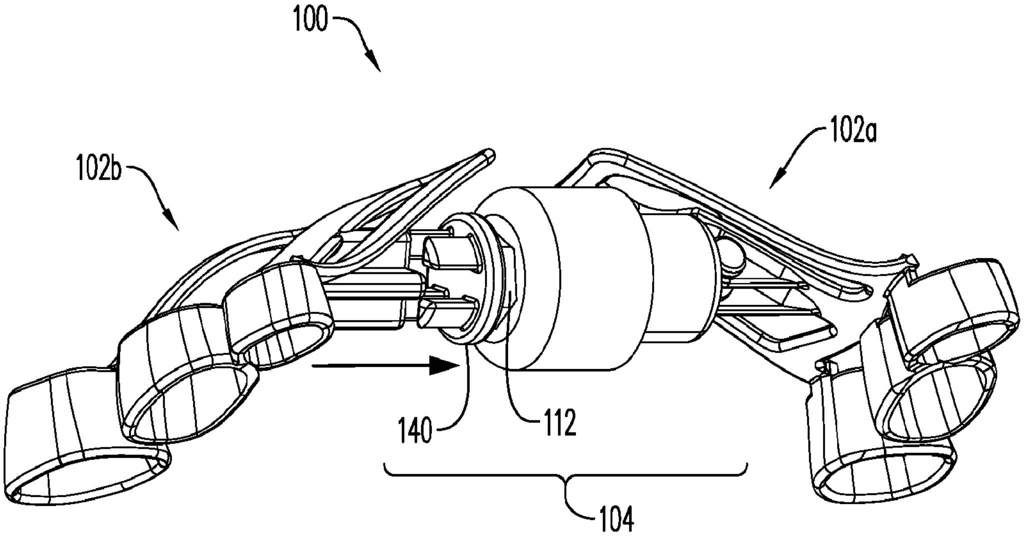
FIGS. 2A-2F schematically illustrate use of the orthodontic expansion device of FIG. 1A.

First, to detach the tensioning assembly 104 from the second lateral wing 102*b*, the adjustment rod 112 may be pressed towards the first lateral wing 102*a* to compress the spring within the tensioning assembly housing, as indicated by the arrow in FIG. 2A. If desired, flange 140 may be used as a solid surface to push against with an instrument such as a dental pick to compress the spring.

Figure 2B:
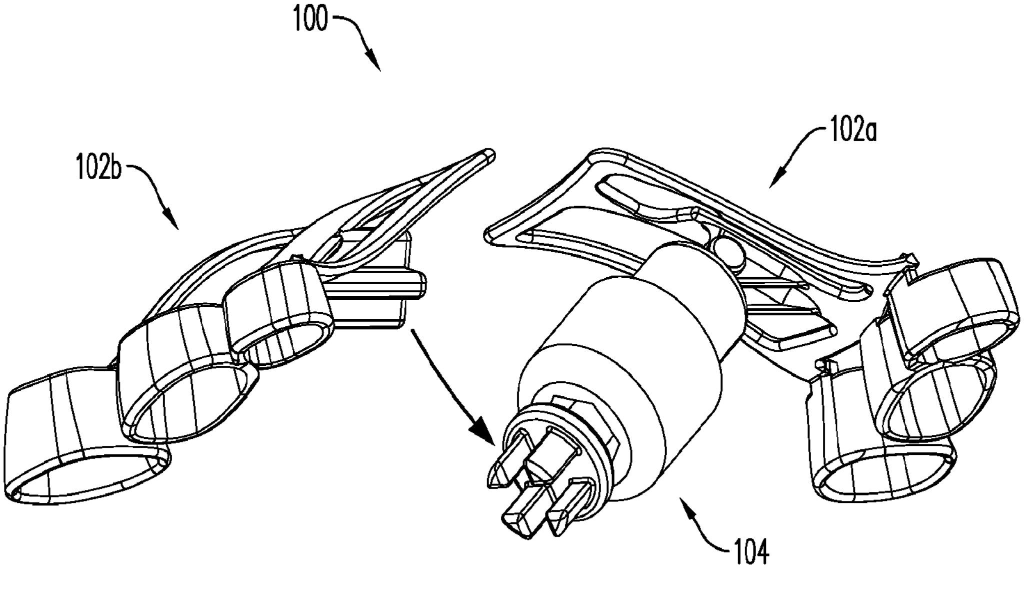
Figure 2C:
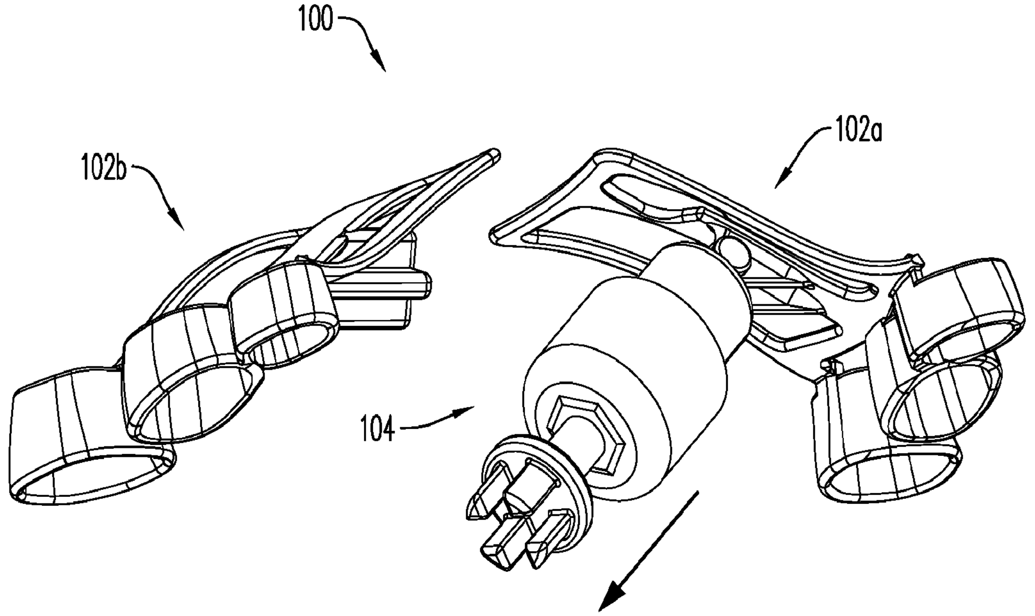

The tensioning assembly 104 may then be rotated to a convenient position away from the first lateral wing 102*a* (e.g., towards the opening of the patient's mouth, or, for instance, towards the tongue when the orthodontic expansion device 100 is positioned in the maxilla of the patient), as shown in FIG. 2B. When the tensioning assembly 104 is released, the spring will expand to its fully extended position (limited by the position of the threaded adjustment rod 112 and/or the piston and the cylinder cap), as shown in FIG. 2C.

Figure 2D:
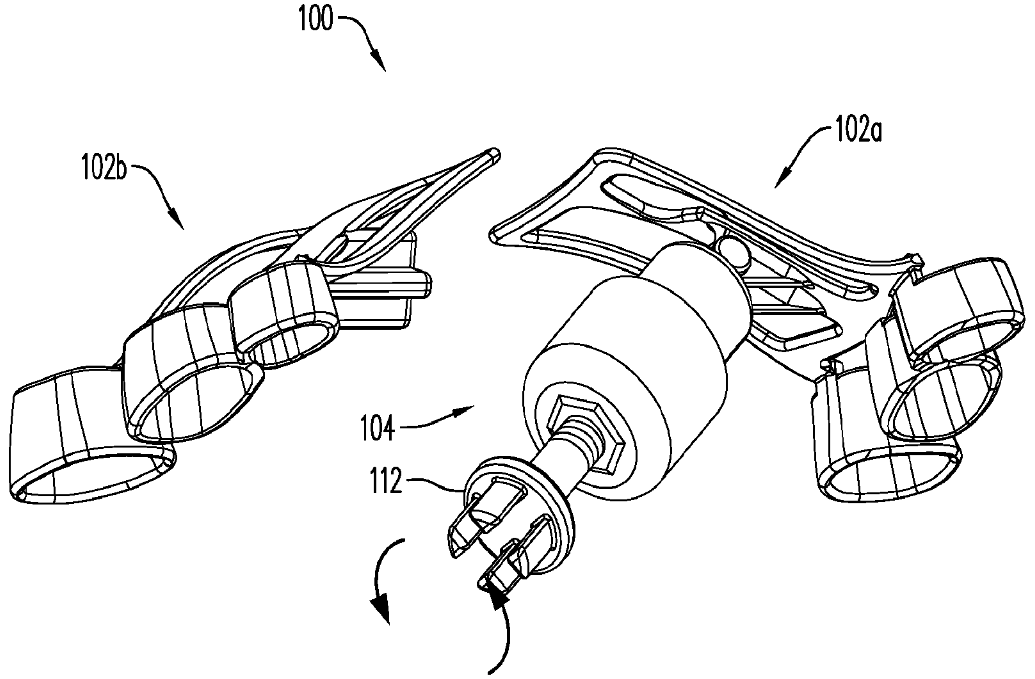

As shown in FIG. 2D, the tension of the device 100 may be adjusted by rotating the adjustment rod 112 the desired number of turns, for example, in one-quarter turn increments. In one embodiment, rotating the adjustment rod 112 to the left (in a counter-clockwise direction) backs the adjustment rod 112 out of the piston, and increases the tension between the first and second lateral wings 102*a*, 102*b* when the tensioning assembly 104 is positioned between the first and second lateral wings 102*a* and 102*b*. Conversely, rotating the adjustment rod to the right (in a clockwise direction) advances the adjustment rod into the piston, and decreases the tension between the first and second lateral wings 102*a*, 102*b* when the tensioning assembly 104 is positioned between the first and second lateral wings 102*a* and 102*b*. In some embodiments, one complete turn may advance the adjustment rod a length of about 0.45 millimeters (mm). Every one-quarter turn may thus adjust the length by about 0.1125 mm. If desired, the four locking teeth may each have a different color (not shown) to give a visual indication of the rotational advancement of the adjustment rod.

Figure 2E:
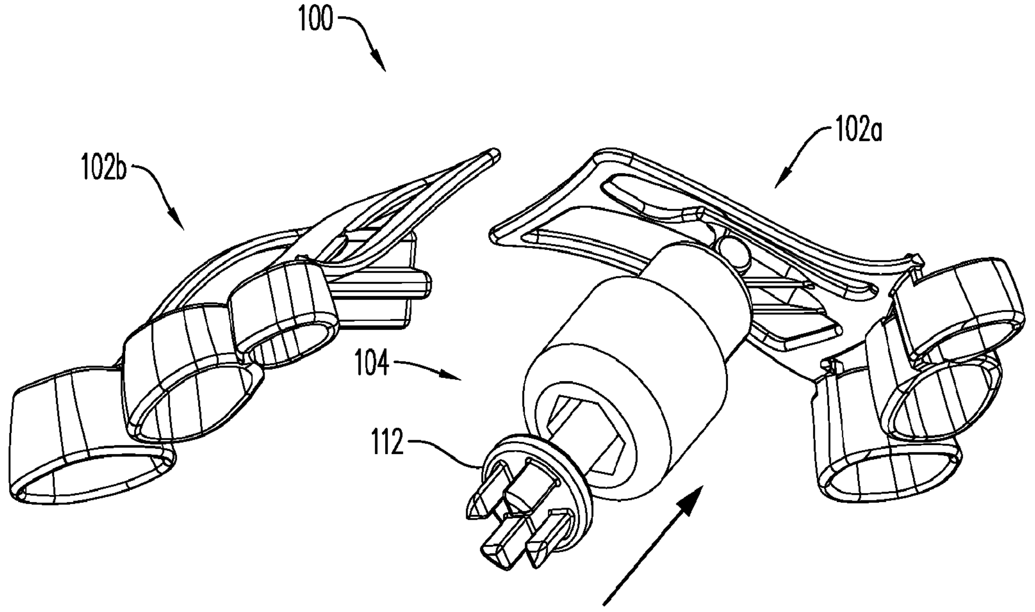
Figure 2F:
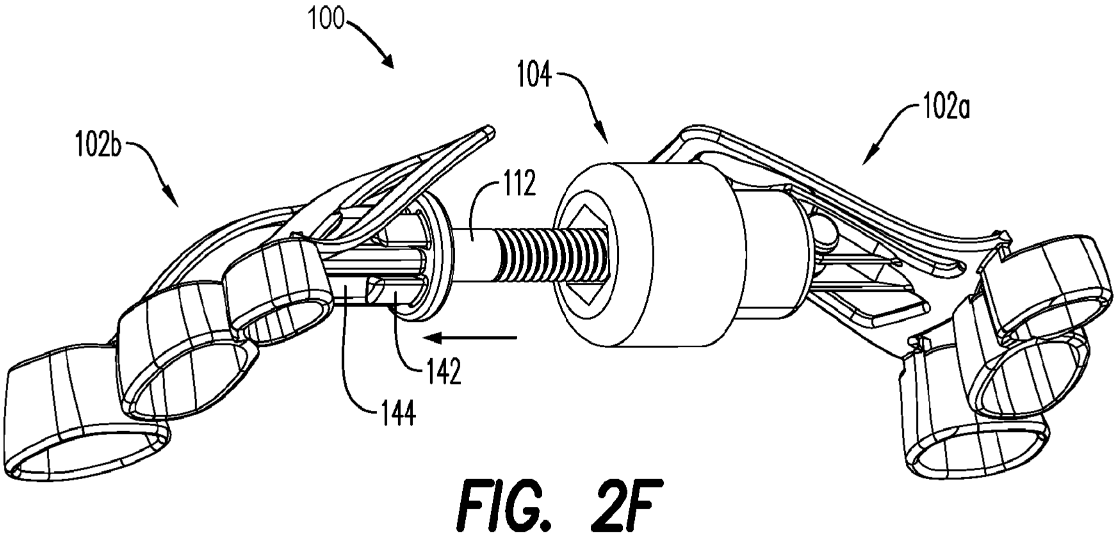

When the desired length is reached, the adjustment rod 112 can be reattached to the second lateral wing 102*b* by urging the tensioning assembly 104 back toward the first lateral wing 102*a* to compress the spring within the housing (FIG. 2E). The teeth 142 may then be aligned with the cross-shaped connector 144 in any one of the four connection positions (i.e., every 90° or 4 times per revolution), and releasing the tensioning assembly 104, as shown in FIG. 2F.

Figure 3A:
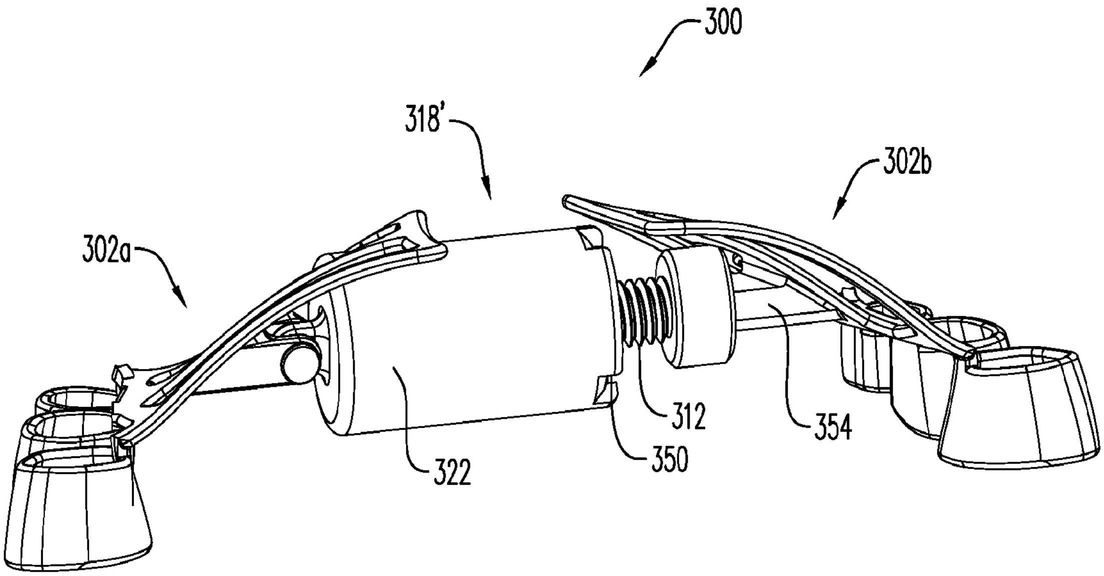
FIG. 3A is a schematic, perspective view of an orthodontic expansion device according to alternate embodiment.

FIG. 3A is schematic, perspective view of an alternate embodiment of an orthodontic expansion device 300. As will be understood by those of ordinary skill in the art, the orthodontic expansion device 300 includes several features similar to those of the orthodontic expansion device 100 illustrated in FIGS. 1A-1E and FIGS. 2A-2F, and described hereinabove, except as described below. For purposes of brevity, the description of similar features is not repeated here.

Figure 3B:
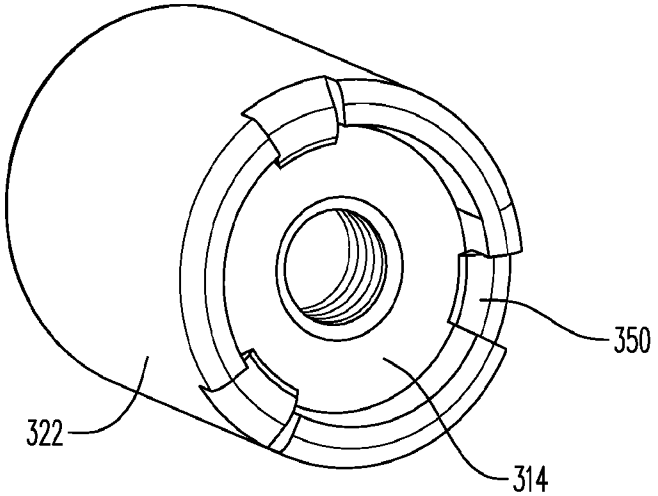
FIG. 3B is a schematic, perspective view of a cylinder and a piston of the orthodontic expansion device of FIG. 3A, in isolation.

In this embodiment, the cylinder cap 128 of the device 100 of FIG. 1A is omitted, and instead, the orthodontic expansion device 300 is provided with a retention crimp 350 positioned along a periphery of the open end of the cylinder 322. According to an aspect, a plurality of retention crimps 350 may be provided. As best seen in FIG. 3B, which shows the cylinder 322 and piston 314 in isolation, the retention crimps 350 are bent inwardly towards the interior of the cylinder 322 to maintain the piston 314 and spring (not shown in FIG. 3B) within the cylinder 322. In the illustrated orthodontic expansion device 300, there are three retention crimps 350. However, other possibilities are contemplated. As is evident from FIG. 3A, elimination of the cylinder cap 128 (FIG. 1A) allows the housing 318' (now including only cylinder 322 and crimps 350) to have a more compact size/shape, which may provide more comfort to the patient.

Figure 3C:
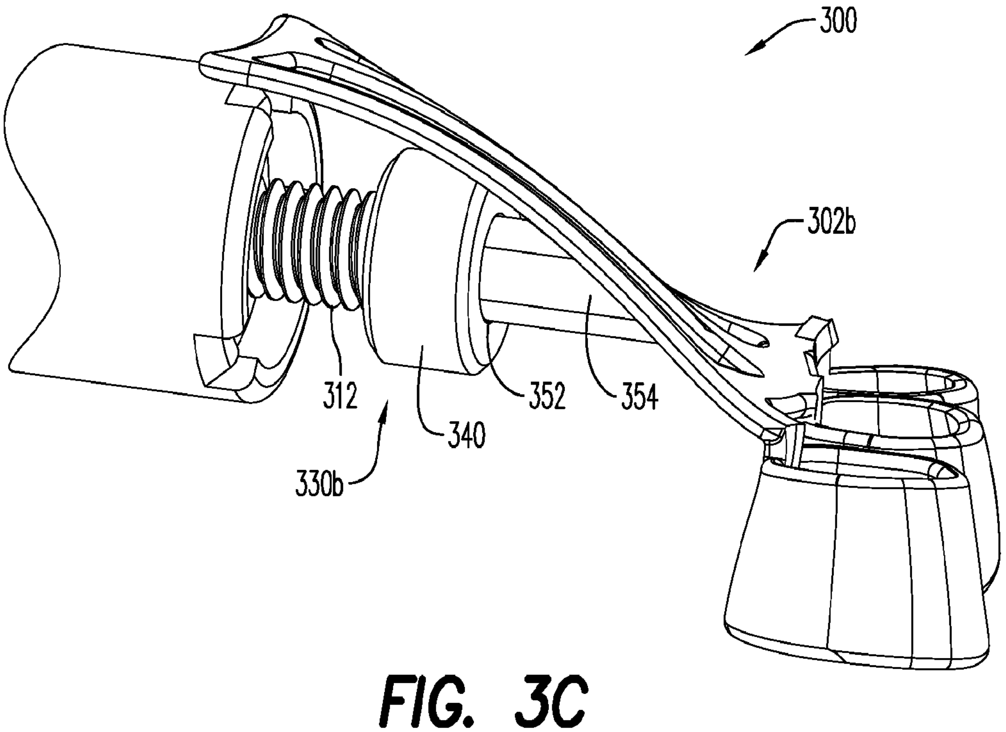
FIG. 3C is a partial, enlarged view of the orthodontic expansion device of FIG. 3A.
Figure 3D:
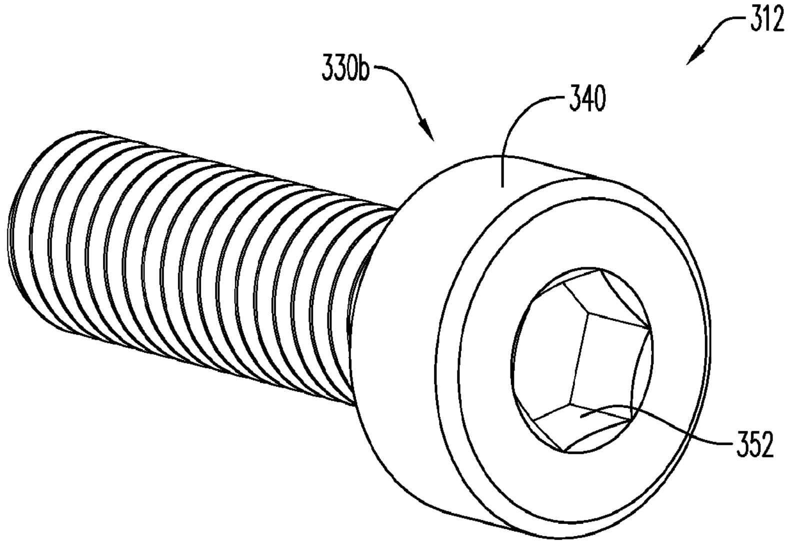
FIG. 3D is a schematic, perspective view of an adjustment rod of the orthodontic expansion device of FIG. 3A, in isolation.

Additionally, as shown in FIG. 3C, in this embodiment, the second end 330*b* of the adjustment rod 312 engages the second lateral wing 302*b* differently than the orthodontic expansion device 100 of FIG. 1A. Specifically, the flattened area or flange 340 of the adjustment rod 312 of the orthodontic expansion device 300 of FIG. 3A includes a recess 352 configured (e.g., shaped) to receive a corresponding shaped connector/projection 354 that extends inwardly from the second lateral wing 302*b* towards the first lateral wing 302*a*. In this example, both the recess 352 and projection/connector 354 have a generally hexagonal shape (e.g., with six sides/flattened surfaces), such that the adjustment rod 312 can be turned six times and fit in six different rotational positions (one for each side of the hexagon). However, it is contemplated that other shapes may be used for the recess 352 and projection 354 that may provide other numbers of rotational fit possibilities. As described above, each side of the hexagonal recess 352 and/or projection 354 may be provided with markings or other indicia (not shown) to assist with indicating the degree of rotation.

It will be appreciated by those of ordinary skill in the art that the ability to adjust the orthodontic expansion devices 100, 300 described herein provides significant advantages over conventional expansion devices, which typically require the use of small tools, such as wrenches, to make small adjustments inside the patient's mouth. This not only provides greater convenience to the dentist, but substantially improved comfort to the patient while adjustments are being made.

Additionally, it will be appreciated that the fundamental concepts presented herein can readily be adapted to similar or related concepts. For example, the present design can be readily adapted to devices used in conjunction with orthopedic surgery for bone expansion of either long bones of the limbs or the jaw bone during distraction osteogenesis, or the like. Accordingly, the present disclosure should not be interpreted as being limited solely to palate expansion devices, despite the emphasis thereon for exemplary purposes.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. An orthodontic expansion device, comprising:

a first lateral wing and a second lateral wing opposite one another, wherein the first lateral wing and the second lateral wing each comprise;

a molar band shaped to receive a molar of a patient, and a palate frame extending obliquely from the molar band, the palate frame being shaped to at least partially conform to and lie against the patient's palate;

a hinge arm extending from the palate frame of the first lateral wing towards the palate frame of the second lateral wing; and a tensioning assembly disposed between the first and second lateral wings and configured to apply tension to the first and second lateral wings, wherein the tensioning assembly comprises a first end pivotably attached to the hinge arm of the first lateral wing via a hinge pin and a second end detachably attached to the second lateral wing, an adjustment rod, a piston, and a spring, wherein the adjustment rod, the piston, and the spring are coaxially aligned with one another and wherein the adjustment rod is at least partially threaded into an interior bore of the piston, wherein the tension of the tensioning assembly is configured to be adjusted by detaching the second end from the second lateral wing and pivoting the first end about the hinge pin to rotate the tensioning assembly away from the first lateral wing to allow for adjustment of the tension of the tensioning assembly through the adjustment rod.

2. The orthodontic expansion device of claim 1, wherein the adjustment rod retains the piston against the spring to maintain the first lateral wing and the second lateral wing in an outwardly tensioned relationship away from each other.

3. The orthodontic expansion device of claim 2, wherein the adjustment rod is rotatable to increase the tension between the first lateral wing and the second lateral wing when both the molar band of the first lateral wing and the molar band of the second lateral wing are worn on teeth of the patient.

4. The orthodontic expansion device of claim 1, wherein the piston comprises a shoulder configured for engagement with the spring.

5. The orthodontic expansion device of claim 1, wherein the adjustment rod comprises:

a first end comprising a thread that engages a corresponding thread extending along the interior bore of the piston.

6. The orthodontic expansion device of claim 5, wherein the adjustment rod further comprises:

a second end comprising a flange comprising a plurality of outwardly extending clutch teeth configured to engage with a cross-shaped connector projecting inwardly from the second lateral wing.

7. The orthodontic expansion device of claim 6, wherein the cross-shaped connector further comprises a plurality of bars configured to fit between the plurality of outwardly extending clutch teeth of the second end, and wherein the adjustment rod is rotatable to adjust the tension of the orthodontic expansion device.

8. The orthodontic expansion device of claim 7, wherein the tensioning assembly is configured to be detachably attached to the second lateral wing by disengagement of the plurality of outwardly extending clutch teeth from the plurality of bars of the cross-shaped connector.

9. The orthodontic expansion device of claim 8, wherein the adjustment rod is moveable towards the first lateral wing to compress the spring, such that the plurality of outwardly extending clutch teeth can be disengaged from the plurality of bars of the cross-shaped connector.

10. The orthodontic expansion device of claim 1, wherein the piston, the spring, and a portion of the adjustment rod are enclosed within a housing.

11. The orthodontic expansion device of claim 10, wherein the housing is pivotably connected to the first lateral wing via the hinge pin to pivotably attach the tensioning assembly to the first lateral wing.

12. The orthodontic expansion device of claim 11, wherein the housing is pivotably connected to the palate frame of the first lateral wing via the hinge pin.

13. An orthodontic expansion device, comprising:

a first lateral wing and a second lateral wing opposite one another, wherein the first lateral wing and the second lateral wing each include a molar band shaped to receive a molar of a patient, and a palate frame extending obliquely from the molar band, the palate frame being shaped to at least partially conform to and lie against the patient's palate;

a hinge arm extending from the palate frame of the first lateral wing towards the palate frame of the second lateral wing; and a tensioning assembly disposed between the first lateral wing and the second lateral wing and configured to apply tension to the first and second lateral wings, wherein the tensioning assembly comprises:

a cylinder having a first, closed end pivotably attached to the hinge arm of the first lateral wing via a hinge pin and a second, open end opposite the closed end, a spring positioned within the cylinder, a piston adjacent the spring, and an adjustment rod, wherein a first end of the adjustment rod attached to the piston and retains the piston against the spring to maintain the first lateral wing and the second lateral wing in an outwardly tensioned relationship away from each other and a second end of the adjustment rod is detachably attached to the second lateral wing, and wherein the tension of the tensioning assembly is configured to be adjusted by detaching the second end from the second lateral wing and pivoting the first end about the hinge pin to rotate the tensioning assembly away from the first lateral wing to allow for adjustment of the tension of the tensioning assembly through the adjustment rod.

14. The orthodontic expansion device of claim 13, wherein the spring includes:

a first end disposed along the first, closed end of the cylinder, and a second end opposite the first end of the spring.

15. The orthodontic expansion device of claim 14, wherein the piston comprises:

a first shoulder for engaging the second end of the spring; and a second shoulder positioned within the cylinder.

16. The orthodontic expansion device of claim 15, further comprising:

an interiorly threaded cylinder cap having a plurality of internal threads; and a plurality of external threads extending along an exterior surface of the second, open end of the cylinder, wherein the internal threads engages the external threads to retain the spring and the second shoulder of the piston within the cylinder.

17. The orthodontic expansion device of claim 13, wherein the cylinder further comprises:

a plurality of retention crimps along a periphery of the second, open end of the cylinder, wherein the plurality of retention crimps are bent inwardly towards an interior of the cylinder to maintain the piston and the spring within the cylinder.

18. The orthodontic expansion device of claim 13, wherein the piston, the spring, and a portion of the adjustment rod are enclosed within the cylinder pivotably connected to the first lateral wing.

* * * * *